United States Patent [19]
Gustin et al.

[11] Patent Number: 5,494,125
[45] Date of Patent: Feb. 27, 1996

[54] TRACK SUPPORTING ROLLER APPARATUS

[75] Inventors: Craig R. Gustin, Rochelle; Keith R. Schmidt, Sycamore, both of Ill.

[73] Assignee: Caterpillar Paving Products Inc., Minneapolis, Minn.

[21] Appl. No.: 292,998

[22] Filed: Aug. 19, 1994

[51] Int. Cl.⁶ .................................................. B62D 55/00
[52] U.S. Cl. ................... 180/9.1; 180/9.5; 305/28
[58] Field of Search ............................ 180/6.7, 9.1, 9.42, 180/9.48, 9.5; 305/21, 24, 28

[56] References Cited

U.S. PATENT DOCUMENTS

| 1,261,031 | 4/1918 | Joyner | 305/28 |
| 1,354,108 | 9/1920 | Johnson | 180/6.7 |
| 1,461,028 | 7/1923 | Davis | 180/6.7 |
| 2,426,816 | 9/1947 | Busque | 180/6.7 |
| 4,817,746 | 4/1989 | Purcell et al. | 190/9.1 |

FOREIGN PATENT DOCUMENTS

| 0208726 | 4/1960 | Austria | 305/28 |
| 0524724 | 11/1976 | U.S.S.R. | 180/9.1 |
| 0141963 | 4/1920 | United Kingdom | 180/9.5 |

*Primary Examiner*—Margaret E. Focarino
*Assistant Examiner*—Victor E. Johnson
*Attorney, Agent, or Firm*—Claude F. White

[57] ABSTRACT

A track supporting roller apparatus supports the articulated track chain of an undercarriage assembly of a track-type work machine. Vibrations and shock loads are generated to a track-type work machine when load bearing track rollers contact the articulated joints of the track chain and the born load is not picked up by an adjacent track roller. The subject roller apparatus has track rollers spaced to support the track chain and prevent the introduction of vibrations and shock loads.

10 Claims, 2 Drawing Sheets

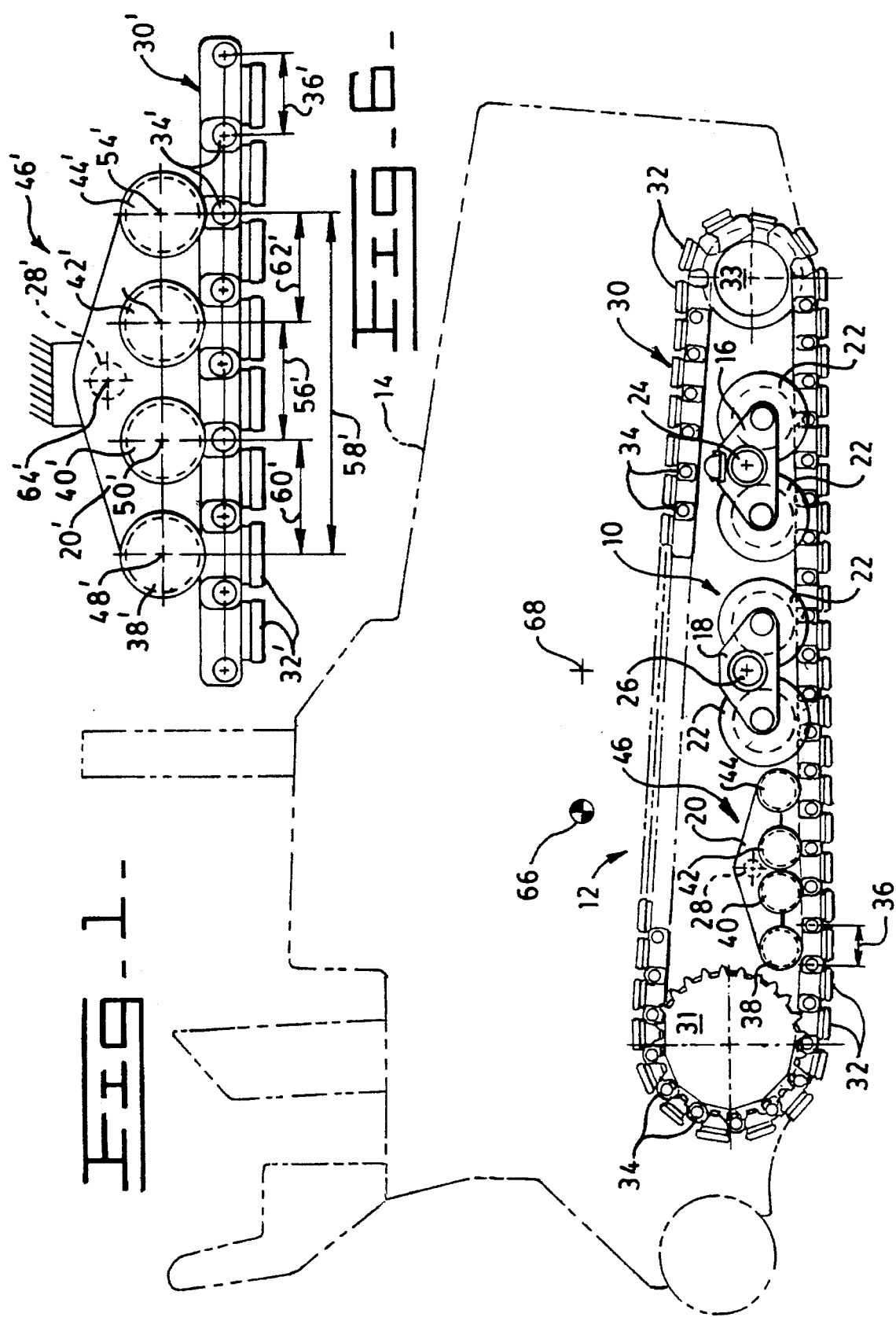

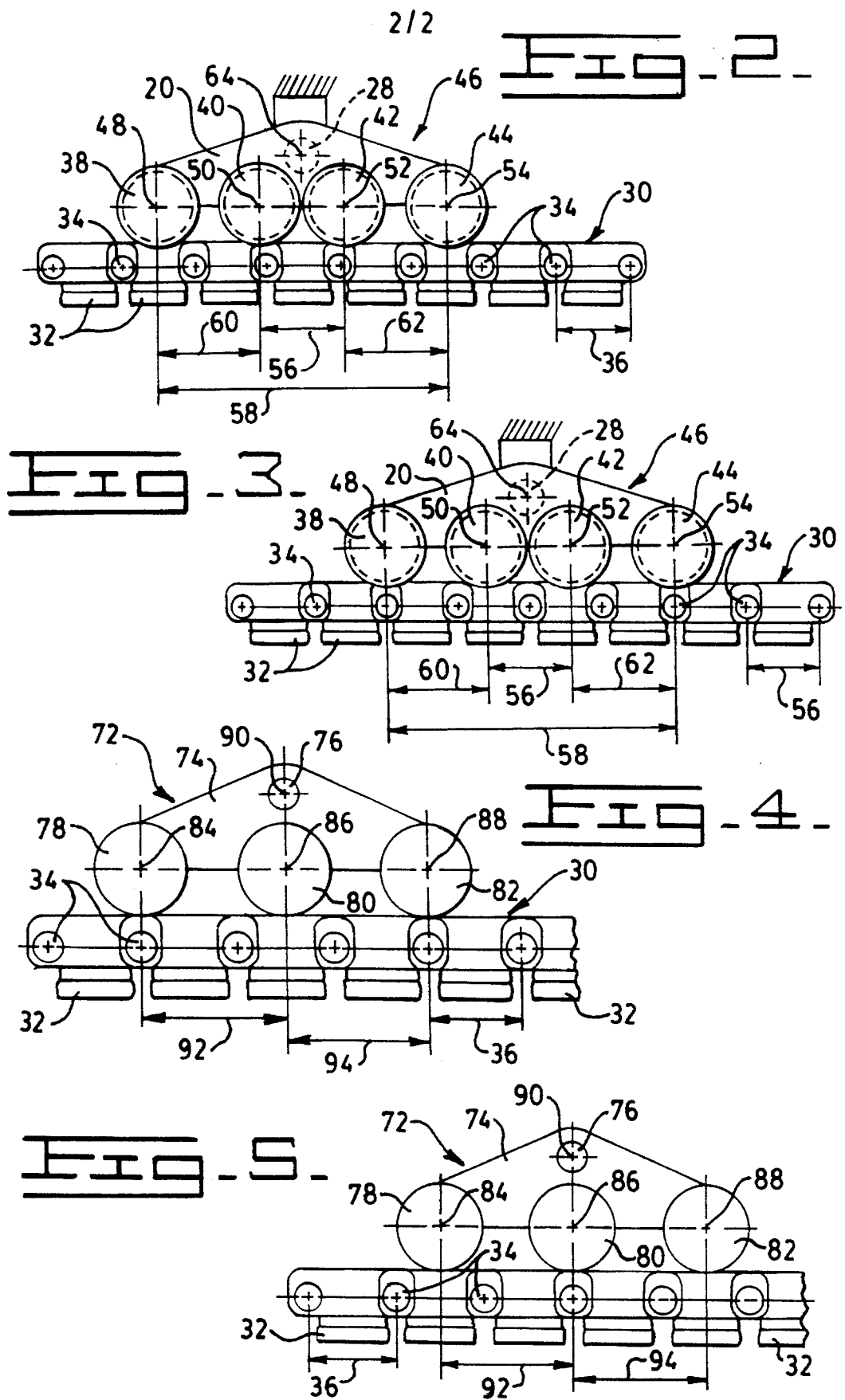

5,494,125

TRACK SUPPORTING ROLLER APPARATUS

TECHNICAL FIELD

This invention relates generally to track roller apparatus and more particularly to a bogie device having a plurality of track supporting rollers which are spaced with respect to the pitch of an endless track.

BACKGROUND ART

Self-laying track-type work machines are supported and propelled by an undercarriage assembly which includes an endless track chain having a plurality of interconnected articulated components. The undercarriage assembly generally includes a plurality of track supporting rollers which guide the endless track and support it as it travels over various ground conditions. Traditionally, tracked undercarriage has been designed to avoid a track roller spacing which is equal to the track pitch, or multiples of the track pitch. This is done primarily to avoid harmonic vibrations which are produced by the track rollers "timing" with the track chain articulation joints.

Vehicle vibrations and shocks are often generated when a load bearing track roller contacts a discontinuity in the track chain, such as the articulation joint between adjacent track chain components. If the born load is not supported by the articulation joint, the load must be picked up, or supported, by an adjacent track roller. If machine displacement occurs before the load is supported by other rollers, a vibration or shock is induced into the machine. Such vibrations and shock loads produce discomfort to the machine operator and reduce the useful life of some machine components.

Certain types of tracked machines require that the track supporting rollers be bogied to provide a ride leveling feature. Also, some types of tracked machines have the vertical center of gravity significantly offset from the geometric center of the track system. When bogied roller arrangements are used on machines with such offset center of gravity, it is difficult to maintain load carrying and vertically stable track rollers on both sides of the center of gravity at all times. If, as is often the case, there is only a single pair of bogied track rollers behind the center of gravity, a tipping or vertical displacement of the machine will occur when either of the bogie rollers lose track rail support as they traverse over a track link articulation joint.

Some existing tracked machines have utilized fixed, or non-pivoting, rollers in conjunction with a bogied roller arrangement. Other machines have used a multiple roller bogie system with one roller located somewhat near the bogie pivot center. However, these roller arrangements, and other roller systems on current machines, create vertical displacement and vibrations in the machines.

The present invention is directed to overcoming one or more of the problems as set forth above.

DISCLOSURE OF THE INVENTION

In one aspect of the present invention, a track supporting roller apparatus for an undercarriage assembly having an endless track chain comprised of a plurality of interconnected components includes a plurality of bogie arms and a plurality of track supporting rollers rotatably connected to the bogie arms. The rollers are spaced along the bogie arms at predetermined locations to correspond about with the track pitch or about with multiples of the track pitch.

Prior art track-type work machines, which utilize bogied track supporting rollers, generally experience vibrations and shock loads due to the arrangement of the bogies and rollers with respect to the articulated track chain. The subject track supporting roller apparatus provides solutions to these problems by specific spacing of the rollers with respect to the track pitch. The subject roller apparatus therefore provides vehicle stability, improved machine ride, and increased wear life.

BRIEF DESCRIPTION OF THE DRAWINGS

FIG. 1 is a diagrammatic side elevational view of an undercarriage assembly incorporating the subject invention;

FIG. 2 is a diagrammatic enlarged side elevational view of a bogie device incorporating the subject invention with the track rollers in a first supporting position;

FIG. 3 is a diagrammatic enlarged side elevational view similar to FIG. 2 with the track rollers in a second supporting position;

FIG. 4 is a diagrammatic enlarged side elevational view of another bogie device incorporating the subject invention with the track rollers in a first supporting position;

FIG. 5 is a diagrammatic enlarged side elevational view similar to FIG. 4 with the track rollers in a second supporting position; and FIG. 6 is a diagrammatic enlarged side elevational view of yet another bogie device incorporating the subject invention with the track rollers in a first supporting position.

BEST MODE FOR CARRYING OUT THE INVENTION

Referring to the drawings, a track supporting roller apparatus 10 for an undercarriage assembly 12 of a self-laying track-type machine 14 includes a plurality of bogies arms 16,18,20, and a plurality of track supporting rollers 22 rotatably connected to two of the bogie arms 16,18. The bogie arms 16,18,20, have respective pivot connections 24,26,28 about which the bogie arms 16,18,20 pivot. The undercarriage assembly 12 includes an endless track chain 30 which has a plurality of interconnected track components 32. The undercarriage assembly 12 also includes a drive wheel 31 for powering the track chain 30, and an idler wheel 33 which reverses the direction of travel of the track chain 30. Each track component 32 is pivotably connected to an adjacent track component 32 by an articulation joint 34. Each track component 32 is substantially equally spaced from an adjacent track component 32 to define a predetermined track pitch or spacing 36.

With particular reference to FIGS. 1, 2, and 3, one of the bogie arms 20 has first, second, third, and fourth track supporting rollers 38,40,42,44 rotatably connected thereto. The bogie arm 20 and the associated support rollers 38,40, 42,44 define a bogie device 46. The support rollers 38,40, 42,44 have respective first, second, third, and fourth axes of rotation 48,50,52,54. The distance 56 between the second and third axes of rotation 50,52 is about equal to one track pitch 36, and the distance 58 between the first and fourth axes of rotation 48,54 is about equal to four track pitches 36.

With particular reference to FIGS. 2 and 3, the distance 60 between the first and second axes of rotation 48,50 is substantially equal to the distance 62 between the third and fourth axes of rotation 52,54. Distance 60 and 62 are also about equal to one and one-half track pitches 36. The pivot connection 28 of the bogie arm 20 has a pivot axis 64 and the first and fourth axes of rotation 48,54 are spaced an equal distance from the pivot axis 64. Likewise, the second and third axes of rotation 50,52 are spaced an equal distance from the pivot axis 64.

With particular reference to FIG. 1, the track-type machine 14 has a center of gravity 66 and the undercarriage assembly 12 has a geometric center 68. The center of gravity 66 is significantly offset from the geometric center 68 toward the rear of the machine 14. The bogie device 46 is spaced rearwardly of the center of gravity 66, or toward the drive wheel 31.

With particular reference to FIGS. 4 and 5, another type of bogie device 72 is shown. The bogie device 72 is intended for use as part of the track supporting roller apparatus 10 previously described and would be used in place of the bogie device 46. The remainder of the track-type machine 14 and undercarriage assembly 12 would be substantially similar to that shown in FIG. 1 and previously described. The bogie device 72 includes a bogie arm 74 having a pivot connection 76, and first, second, and third track supporting rollers 78,80,82 rotatably connected to the bogie arm 74. The rollers 78,80,82 have respective first, second, and third axis of rotation 84,86,88 and the pivot connection 76 has a pivot axis 90. The distance 92 between the first and second axes of rotation 84,86 is substantially equal to the distance 94 between the second and third axes of rotation 86,88. Distances 92 and 94 are each about equal to one and one-half track chain pitches 36.

The first and third axes of rotation 84,88 are spaced substantially equal distances from the pivot axis 90. The second axis of rotation 86 is substantially in vertical alignment with the pivot axis 90. With particular reference to FIGS. 1, 4, and 5, the bogie arm 74 is spaced rearwardly of the center of gravity 66, or toward the drive wheel 31.

With particular reference to FIG. 6, yet another type of bogie device 46' is shown. The bogie device 46' is similar to the bogie device 46 shown in FIGS. 2 and 3, and similar reference numerals, with a prime symbol, will be used to indicate similar structures. In the bogie device 46', as shown in FIG. 6, the first and third support rollers 38',42' are substantially directly over the track components 32'. In this position, the vertical load is supported on both sides of the pivot axis 64' by the first and third support rollers 38',44'. In a second support position, as the track chain 30' moves, the second and fourth support rollers 40', 44' are substantially directly over the track components 32'. In this second support position, the vertical load is supported on both sides of the pivot axis 64' by the second and fourth support rollers 40',44'. This particular support arrangement is possible because the distance 60' between the first axis of rotation 48' and the second axis of rotation 50' is about equal to the distance 56' between the second axis of rotation 50' and the third axis of rotation 52'. Distance 60' is also about equal to the distance 62' between the third axis of rotation 52' and the fourth axis of rotation 54'. Each distance 60', 56', and 62' is also equal to about one and one-half pitches 36' of the track chain 30. This makes the distance 58' between the first axis of rotation 48' and the fourth axis of rotation 54' about equal to four and one-half pitches 36' of the track chain 30.

Industrial Applicability

With reference to the drawings and the previous detailed description, the subject track supporting roller apparatus 10, and particularly the bogie devices 46, 72, are useful for preventing vertical displacement of the undercarriage assembly 12 and the resulting vibrations and shock loads to the machine 14. FIGS. 2 and 3 illustrate how the bogie device 46 with the four roller bogie suspension minimizes vertical displacement. FIG. 2 illustrates the condition that occurs when the second and third rollers 40,42 (center rollers) are near or over the articulating joints 34. Vertical displacement is controlled and the load is carried by the first and fourth support rollers 38,44 (outer rollers) that are substantially over the mid-span of the track components 32, or chain links. FIG. 3 illustrates the condition that occurs when the first and fourth rollers 38,44 (outer rollers) are near or over the articulation joints 34. Vertical displacement is controlled and the load is carried by the second and third support rollers 40,42 (inner rollers) that are substantially over the mid-span of the track components 32, or chain links. The load alternates from the second and third rollers 40,42 (inner rollers) to the first and fourth rollers (outer rollers) when the vehicle is in motion. The load transfer occurs without a resulting vertical displacement of the machine 14. The optimum machine stability and support is provided in this bogied arrangement when the first and fourth rollers 38,44 (outer) are spaced at about four track pitches 36 apart, and the second and third rollers 40,42 (inner) are spaced at about one track pitch 36 apart.

FIGS. 4 and 5 illustrate how the bogie device 72 with the three roller bogie suspension minimizes vertical displacement. Optimum machine stability and support is provided in this arrangement when the first and third support rollers 78,82 (outer) are spaced at about three track pitches 36 apart, and the second support roller 80 (inner) is centered between the first and third rollers 78,82. FIG. 4 illustrates the condition that occurs when the second roller 80 is substantially located in the center of a track component 32, or track link and the first and third rollers 78,82 are near or over an articulation joint 34. The second roller 80 provides vertical load and vertical support. FIG. 5 illustrates how the load is equally shared and vertically supported by the first and third rollers 78,82 (outer) when they are substantially located in the center of a track component 32, or track link, and the second roller 80 is near or over an articulation joint 34. The load alternates between the first and third rollers 78,82 and the second roller 80 when the vehicle is in motion.

Other aspects, objects, and advantages of this invention can be obtained from a study of the drawings, the disclosure, and the appended claims.

We claim:

1. A self-laying track-type machine, comprising:

a track supporting roller apparatus, said track supporting roller apparatus including a plurality of bogie arms, each having a pivot connection;

an undercarriage assembly, said undercarriage assembly including an endless track chain having a plurality of interconnected track components, each component being spaced from an adjacent component by a predetermined pitch;

a plurality of track supporting rollers rotatably connected to each bogie arm;

at least one of said bogie arms having first, second, third, and fourth track supporting rollers having respective first, second, third, and fourth axes of rotation, the distance between said second and third axis of rotation being about equal to one pitch of said track chain and the distance between said first and fourth axis of rotation being about equal to four pitches of said track chain; and said track-type machine has a center of gravity and said one bogie arm is rearward of the center of gravity.

2. A self-laying track-type machine, as set forth in claim 1, wherein the distance between said first and second axis of rotation is about equal to one and one-half pitches of said track chain.

3. A self-laying track-type machine, as set forth in claim 1, wherein the distance between said third and fourth axis of rotation is about equal to one and one-half pitches of said track chain.

4. A self laying track-type machine, as set forth in claim 1, wherein said pivot connection of said one bogie arm has a pivot axis, and said first and fourth axis of rotation are spaced an equal distance from said pivot axis.

5. A self laying track-type machine, as set forth in claim 1, wherein said pivot connection of said one bogie arm has a pivot axis, and said second and third axis of rotation are spaced an equal distance from said pivot axis.

6. A self laying track-type machine, as set forth in claim 2, wherein said undercarriage assembly has a geometric center and said center of gravity is significantly offset from said geometric center.

7. A self-laying track-type machine, comprising:

a bogie device, said bogie device including a bogie arm having a pivot connection;

an undercarriage assembly, said undercarriage assembly including an endless track chain, said endless track chain having a plurality of interconnected track components, each component being spaced from an adjacent component by a predetermined pitch;

said track-type machine has a center of gravity, and said undercarriage assembly has a geometric center, said center of gravity being significantly offset from said geometric center;

first, second, third, and fourth track supporting rollers rotatably connected to said bogie arm, said rollers having respective first, second, third, and fourth axes of rotation;

the distance between said second and third axes of rotation being about equal to one pitch of said track chain; and the distance between said first and fourth axes of rotation being about equal to four pitches of said track chain.

8. A self-laying track-type machine, comprising:

an undercarriage assembly, said undercarriage assembly including an endless track chain, said endless track chain having a plurality of interconnected articulated track components, each component being spaced from an adjacent component by a predetermined pitch;

a drive wheel for powering the track chain;

an idler wheel for reversing the direction of travel of the track chain;

a plurality of bogie arms, each having a pivot connection;

a plurality of track supporting rollers rotatably connected to each bogie arm;

at least one of said bogie arms having first, second, third, and fourth track supporting rollers having respective first, second, third, and fourth axes of rotation;

the distance between said second and third axes of rotation being about equal to one pitch of said track chain and the distance between said first and fourth axes of rotation being about equal to four pitches of said track chain; and said track-type machine has a center of gravity and said one bogie arm is rearward of the center of gravity.

9. A self-laying track-type machine, comprising:

a track supporting roller apparatus, said track supporting roller apparatus having a plurality of bogie arms, each having a pivot connection;

an undercarriage assembly, said undercarriage assembly including an endless track chain, said endless track chain having a plurality of interconnected track components, each component being spaced from an adjacent component by a predetermined pitch;

a plurality of track supporting rollers rotatably connected to each bogie arm;

at least one of said bogie arms having first, second, third, and fourth track supporting rollers having respective first, second, third, and fourth axes of rotation, the distance between said first and second axis of rotation being about equal to the distance between said second and third axes of rotation and also between said third and fourth axes of rotation and the distance between said first and fourth axes of rotation being about equal to four and one-half pitches of said track chain; and said track-type machine has a center of gravity and said bogie arm is rearward of said center of gravity.

10. A self-laying track-type machine, as set forth in claim 9, wherein the distance between said first and second axis of rotation is about equal to one and one-half pitches of said track chain.

* * * * *

UNITED STATES PATENT AND TRADEMARK OFFICE
CERTIFICATE OF CORRECTION

PATENT NO.  : 5,494,125
DATED       : February 27, 1996
INVENTOR(S) : Craig R. Gustin, Keith R. Schmidt It is certified that error appears in the above-identified patent and that said Letters Patent is hereby corrected as shown below:

In Claim 1: Column 4, line 60, delete "axes" and insert "axis".

In Claim 7: Column 5, lines 36, 38 and 41 delete "axes" and insert "axis".

In Claim 8: Column 6, lines 10, 11 and 13 delete "axes" and insert "axis".

In Claim 9: Column 6, lines 33, 36, 37 and 38 delete "axes" and insert "axis".

Signed and Sealed this

Twelfth Day of November, 1996

Attest:

BRUCE LEHMAN

Attesting Officer

Commissioner of Patents and Trademarks